Oct. 17, 1933. C. V. FOULDS Re. 18,969

SURGE PRESSURE CONTROLLING MEANS

Original Filed March 31, 1930

INVENTOR,
Charles V. Foulds
BY Booth & Booth
ATTORNEYS.

Reissued Oct. 17, 1933 Re. 18,969

UNITED STATES PATENT OFFICE 18,969

SURGE PRESSURE CONTROLLING MEANS

Charles V. Foulds, Berkeley, Calif., assignor to The Pelton Water Wheel Company, San Francisco, Calif., a corporation of California Original No. 1,891,636, dated December 20, 1932, Serial No. 440,271, March 31, 1930. Application for reissue March 30, 1933. Serial No. 663,638

11 Claims. (Cl. 103—11)

The present invention relates to means for controlling surges in liquid conveying pipe lines, and is especially adapted for long pumping lines in which the static pressure is relatively small in proportion to the total pumping pressure.

It is well known that surges following the sudden stopping of the pump in a pumping line, or the sudden stopping of the flow in a gravity line, produce pressure rises which are frequently destructive, and that these conditions are aggravated in long lines in which the static head is relatively low. It is usually impracticable, in a line of this character, to use a surge chamber open to the atmosphere, because such a chamber, if located near the pump where it is most needed, would necessarily be of prohibitive height; and even in cases where the pumping pressure is such as to render a surge chamber feasible, its use does not prevent surges, but merely limits the maximum pressure thereof to a value only slightly above the pumping pressure, and by providing a free path allows the surges to continue until finally damped out by friction. This latter condition is objectionable in that it subjects the pipe to severe pressure fluctuations for a considerable period of time. Another method of controlling surges is to employ a pressure controlled slow acting check or relief valve at the pump to gradually close or relieve the line as the surge pressure rises. Such valves require delicate adjustment, and their efficiency is seriously impaired by any variation in the time factor of the surge, due to varying conditions under which the pump stops.

The present invention provides a means for obviating all the above adverse conditions. By its use the pressure of the initial surge is reduced to that of the static head, and the surge is damped out almost immediately. It can be embodied in a simple mechanism requiring no delicate adjustments.

These and other objects and advantages of the invention will become apparent from the following description, which should be read with the understanding that the form, construction, and arrangement of the several parts may be varied, within the limits of the claims, hereto appended, without departing from the spirit of the invention as set forth therein.

A preferred embodiment of the invention will now be described fully with reference to the accompanying drawing, wherein.

Figure 1:
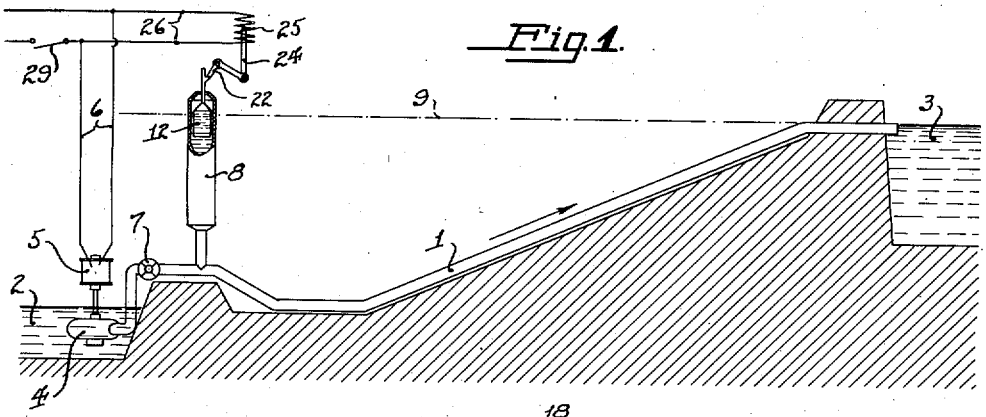
Fig. 1 is a diagram illustrating the invention as applied to a pumping line.

In the drawing, the reference numeral 1 designates a pipe line through which water is being pumped from a lower reservoir 2 to a higher reservoir 3. 4 is a pump, driven by an electric motor 5. 6 is the electric line supplying power to said motor. 7 is a check valve, which may be either a simple type or a pressure actuated throttling and slow-closing type, as desired.

Figure 2:
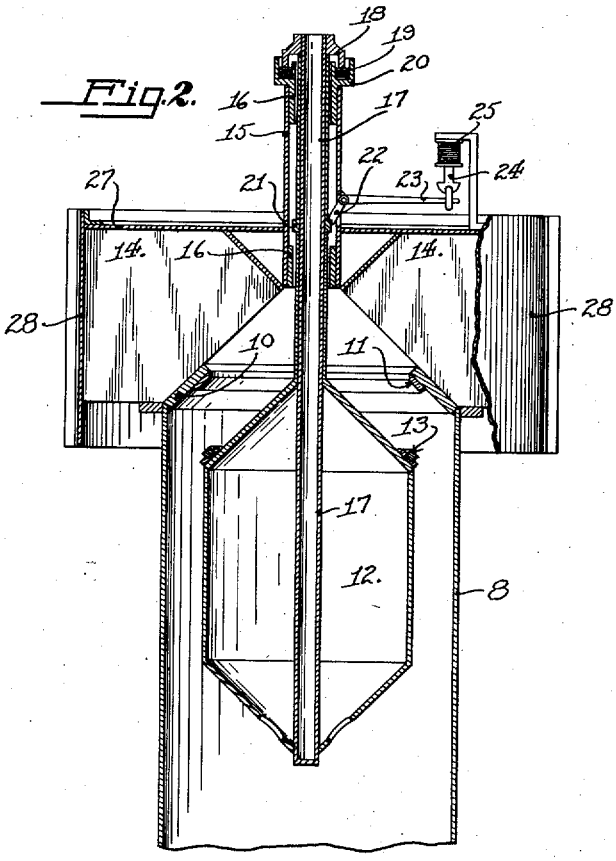
Fig. 2 is a partly broken vertical section of the automatic relief valve.

A stand-pipe 8 is connected with the line 1 near the check valve 7, and extends slightly above the static level of the water, as represented by the line 9. The upper end of said stand-pipe is provided with a flange 10, Fig. 2, preferably inwardly tapering, and provided with a valve seat 11. A float 12, provided with a valve face 13 adapted to cooperate with the seat 11 to close the upper end of the stand-pipe, is mounted within said pipe. A plurality of vertical plates 14 are secured to the upper end of the stand-pipe, and support a tubular guide 15, which has bushings 16 forming bearings for a vertically slidable stem 17 secured to the float 12. The upper end of said stem has a flange 18 adapted to abut against a resilient cushion 19 when the float descends. The cushion 19 is mounted in a collar 20 secured to the guide 15.

The float stem 17 has a collar 21 which is adapted to be engaged by a swinging latch 22 to hold the valve 11—13 in open position. The outer end 23 of said latch is connected with the armature 24 of a solenoid 25, which is connected by wires 26 with the pump power line 6. The solenoid is arranged to hold the latch 22 out of engagement with the collar 21 when energized.

It is assumed that the pumping head is considerably greater than the static head as represented by the line 9, on account of the length of the pipe line 1 and the friction of the water therein. Therefore when the pump is operating, water rises in the stand-pipe 8, and closes the float valve 11—13. When the pump stops suddenly, however, the inertia of the flowing water in the pipe line causes an abrupt drop in pressure at the base of the stand-pipe, the water drops in said stand-pipe, and the float valve 11—13 opens. The solenoid 25 being now deenergized through cessation of the electric power, the latch 22 holds said float valve open, so that, when the water in the pipe line surges back into the stand-pipe, it discharges freely therefrom, without raising the pressure materially above the static head, until the surge is dissipated. A deflecting cap, formed of a flat plate 27 and a cylindrical flange 28, is mounted above the upper end of the stand-pipe to direct the issuing water downwardly.

The float valve 11—13 is held open by the latch 22 as long as the pump driving current is off, but as soon as said pump resumes operation, the solenoid 25 releases said latch, and said float valve is closed by the water rising in the stand-pipe.

It should be noted that the solenoid 25, connected with the pump power line, is merely one example of a convenient means for controlling the operation of the float relief valve simultaneously with the operation of the pump. The essential feature of the invention is that the relief valve is controlled by or simultaneously with the pump, so that it remains closed during the normal operation of the pump, but is free to open, if the pump stops, in the event that a condition arises which may produce a surge in the pipe line.

When the electric control means is used as herein described, it is preferable to connect the solenoid directly with the motor terminals, so that any stopping of the pump, whether caused by failure of the electric power or by the opening of the motor control switch, indicated at 25, will cause the solenoid to be deenergized and the valve latch to be placed in operative position.

I claim:

1. In an apparatus for the described purpose, and in combination with a pump and a pipe line, a stand-pipe connected with said pipe line, said stand-pipe having an aperture above the static level of the liquid in said line, a valve for closing said aperture under normal operation of said pump and for opening said aperture during a drop in pipe line pressure below normal, and means for holding said valve open upon the cessation of said pump operation.

2. In an apparatus for the described purpose, and in combination with an electrically driven pump and a pipe line, said pipe line having a relief aperture, a valve adapted to open during a drop in pipe line pressure below normal and to be actuated by the presence of liquid to close said aperture, and electrically controlled means for holding said valve open, said means being actuated by the cessation of the pump driving current.

3. In an apparatus for the described purpose, and in combination with an electrically driven pump and a pipe line, said pipe line having a discharge aperture, a valve adapted to open during a drop in pipe line pressure below normal and to be actuated by the presence of liquid to close said aperture, a latch for holding said valve open, and an electro-magnet connected with the pump driving current for releasing said latch.

4. In an apparatus for the described purpose, and in combination with a pump and a pipe line, a stand-pipe connected with said pipe line, said stand-pipe having an open upper end provided with a valve seat, a float valve adapted for cooperation with said seat to close the end of said stand-pipe, a deflecting cap positioned in spaced relation above the open end of said stand-pipe, and means for opening said valve in response to surge-producing conditions in said pipe line.

5. In a pipe line subject to pressure surges, said pipe line having a discharge aperture, a valve normally closing said aperture, means for opening said valve in response to a drop in pressure within said line, and means for holding said valve open during the succeeding pressure rise.

6. In a pipe line subject to pressure surges, said pipe line having a relief aperture, a valve normally closing said aperture, means for opening said valve in response to surge producing conditions within said line and in advance of a rise in pressure therein, and means for holding said valve open during said pressure rise.

7. In a pipe line subject to pressure surges, the combination comprising a relief aperture adapted to provide a free discharge for said pipe line, a valve normally closing said aperture, means for causing said valve to be in an open position during a period of subnormal pressure within said line, and means for thereafter effecting closing of said valve.

8. In a pipe line subject to pressure surges wherein a down surge causes a drop in pressure which is followed by a return surge or succeeding rise in pressure, the combination comprising a relief aperture for said pipe line, a valve normally closing said aperture during the existence of normal pipe line pressure and flow conditions, means for causing said valve to be in an open position automatically during a period of subnormal pressure within said line, and means for controlling said valve after it is opened whereby pipe line fluid is adapted to be immediately discharged through said aperture upon a return surge.

9. In a pipe line subject to pressure surges, said pipe line having a relief aperture, a fluid pressure actuated discharge valve normally closing said aperture, means for opening said valve in response to a drop in pressure within said line, and means for controlling the operation of said valve during the succeeding pressure rise to effect a free discharge outlet for the pipe line fluid.

10. The method of controlling pressure surges in a pipe line wherein a drop in pressure is followed by a succeeding rise in pressure, consisting in having a discharge aperture closed during normal pipe line conditions, and then opening said discharge aperture during a drop in pipe line pressure and having said aperture open during the succeeding pressure rise, whereby there is provided a substantially free discharge outlet for the pipe line liquid immediately upon the return surge.

11. The method of controlling pressure surges in a pipe line wherein a drop in pressure is followed by a succeeding rise in pressure, consisting in having a discharge aperture closed during normal pipe line conditions, then opening said discharge aperture during a drop in pipe line pressure and having said aperture open during the succeeding pressure rise, whereby there is provided a substantially free discharge outlet for the pipe line liquid immediately upon the return surge, and then reclosing said discharge aperture upon occurrence of normal operating conditions.

CHARLES V. FOULDS.